(12) United States Patent (10) Patent No.: US 12,559,320 B2
Benedetti (45) Date of Patent: Feb. 24, 2026

(54) APPARATUS FOR CONVEYING HORTICULTURAL PRODUCTS

(71) Applicant: UNITEC S.P.A., Lugo (IT)

(72) Inventor: Luca Benedetti, Ravenna (IT)

(73) Assignee: UNITEC S.P.A., Lugo (IT)

( * ) Notice: Subject to any disclaimer, the term of this patent is extended or adjusted under 35 U.S.C. 154(b) by 2 days.

(21) Appl. No.: 18/578,232

(22) PCT Filed: Jun. 9, 2022

(86) PCT No.: PCT/EP2022/065741
§ 371 (c)(1),
(2) Date: Jan. 10, 2024

(87) PCT Pub. No.: WO2023/285042
PCT Pub. Date: Jan. 19, 2023

(65) Prior Publication Data
US 2024/0294340 A1 Sep. 5, 2024

(30) Foreign Application Priority Data
Jul. 13, 2021 (IT) ........................ 102021000018389

(51) Int. Cl.
B65G 17/24 (2006.01)
B07C 5/02 (2006.01)
(Continued)

(52) U.S. Cl.
CPC ................ B65G 17/24 (2013.01); B07C 5/02 (2013.01); B65G 47/24 (2013.01); B65G 47/252 (2013.01);
(Continued)

(58) Field of Classification Search
CPC ...... B65G 47/252; B65G 17/24; B65G 47/24; B65G 47/965; B65G 2201/0211; B07C 5/02; B07C 5/3422
(Continued)

(56) References Cited

U.S. PATENT DOCUMENTS 3,011,620 A * 12/1961 Amori ...................... A23N 4/04
198/779
5,244,100 A * 9/1993 Regier ...................... B07C 5/36
209/939
(Continued)

FOREIGN PATENT DOCUMENTS

EP 0580784 B1 9/1999
EP 2379428 B1 4/2013
ES 2218966 T3 11/2004

OTHER PUBLICATIONS

International Search Report for International Application No. PCT/EP2022/065741, dated Sep. 14, 2022, 3 pages.
(Continued)

*Primary Examiner* — James R Bidwell
(74) *Attorney, Agent, or Firm* — CANTOR COLBURN LLP

(57) ABSTRACT

An apparatus for conveying horticultural products, which includes a component for cyclic movement along an advancement direction of a number of rotating assemblies; at least some pairs of assemblies, which are consecutive, define respective conveyance units for corresponding horticultural products, which can be rested on the pairs substantially above the interspace between the assemblies. Each assembly includes at least four rotating and circular disks; in each unit the external disks of each assembly have a larger diameter than the internal disks of the same assembly and a first internal disk, which is larger, of each assembly has a diameter that is larger than the diameter of the other internal
(Continued)

disk, which is smaller; moreover, the larger disks and the smaller disks are arranged so as to be mutually offset in the two assemblies of the same unit.

7 Claims, 7 Drawing Sheets

(51) Int. Cl.

| | | |
|---|---|---|
| *B07C 5/342* | (2006.01) |
| *B65G 47/24* | (2006.01) |
| *B65G 47/248* | (2006.01) |
| *B65G 47/252* | (2006.01) |
| *B65G 47/96* | (2006.01) |

(52) U.S. Cl.
CPC .......... *B65G 47/965* (2013.01); *B07C 5/3422* (2013.01); *B65G 47/248* (2013.01); *B65G 2201/0211* (2013.01)

(58) Field of Classification Search
USPC .............................................. 198/387, 397.06
See application file for complete search history.

(56) References Cited

U.S. PATENT DOCUMENTS

| | | | |
|---|---|---|---|
| 5,306,877 A * | 4/1994 | Tas ............................ | B07C 5/18 |
| | | | 209/912 |
| 5,626,238 A | 5/1997 | Blanc | |
| 7,222,715 B2 * | 5/2007 | Madden ................. | G01G 15/00 |
| | | | 209/912 |

OTHER PUBLICATIONS

Italian Search Report for Italian Application No. 202100018389, dated Mar. 22, 2022, 8 pages.
Written Opinion for International Application No. PCT/EP2022/065741, dated Sep. 14, 2022, 6 pages.

* cited by examiner

APPARATUS FOR CONVEYING HORTICULTURAL PRODUCTS

CROSS-REFERENCE TO RELATED APPLICATIONS

This application is a 35 U.S.C. § 371 National Stage patent application of PCT/EP2022/065741, filed on 9 Jun. 2022, which claims the benefit of Italian patent application 102021000018389, filed on 13 Jul. 2021, the disclosures of which are incorporated herein by reference in their entirety.

TECHNICAL FIELD

The present disclosure relates to an apparatus for conveying horticultural products.

BACKGROUND

Large companies that deal with the packaging and distribution of fruit and horticultural products in general make extensive use of automated plants or lines, configured to perform different treatments in sequence on a specific horticultural product.

The use of automated systems in fact allows to meet the needs of the market, which requires satisfying an ever-increasing demand while ensuring high quality standards and cost containment.

In greater detail, such lines are provided with means for conveying the horticultural products of interest, which are thus moved along a predefined path and subjected to various treatments by stations and devices arranged along said path.

For example, therefore, plants or lines are widespread which provide first of all a loading station, fed with unsorted masses of a specific fruit (or other horticultural product), often coming directly from the picking fields.

Downstream of the loading station, the movement means typically convey the product toward stations for preliminary treatment (for washing and/or pre-selection, for example), and then towards cameras or other optical and/or measurement devices, which by means of special software detect, for each product, the value assumed by one or more parameters of interest, such as for example color, shape, dimensions, sugar content, ripeness, any decay, weight, etcetera.

Subsequently, the movement means convey each product thus measured toward an unloading station, in which some devices arranged in sequence can be activated in a mutually independent way by an electronic unit, which is provided with instructions to receive and process the data acquired by the measurement devices mentioned above.

Each device leads to a respective collection container: for each product, the electronic unit activates the device that corresponds to the most appropriate container so that all and only those products for which the measured parameter assumes a certain value (or falls within a certain range of values) are accumulated in each of the containers. Thus, for example, all the fruits of the same color, or same weight, or same size, etcetera, accumulate in the various containers.

The movement means that in this context are involved in the transfer of the products are of various types, depending on the requirements and the specific product of interest (and often several different movement systems are used along the same line).

In particular, it should be noted that the products must be presented one by one to the optical instrument, in order to allow the acquisition of the parameters of interest for each one of them; furthermore, the need often arises to roll the products as they move through the viewing area of the optical instrument, so that by making a complete turn about themselves the instrument can analyze the entire outer surface.

It is thus known to use conveyance systems which provide a series of rollers which are moved by a chain or belt along the advancement direction and rotate about respective axes of rotation at right angles to said direction.

One and only one product can thus be arranged at the interspace between two consecutive rollers, resting thereon: therefore, while the products move by resting on pairs of consecutive rollers, they are forced to roll about themselves by the very rotation of the rollers and can thus be analyzed by the optical instrument while they pass through its viewing area.

However, this embodiment is not free from drawbacks.

When the horticultural product is not spherical but has an oblong shape along a prevailing longitudinal axis (as is the case, for example, with kiwifruit), it rolls properly about such axis only when it is arranged so that the axis is parallel to the axis of the rollers. Unfortunately, this condition does not always occur during the loading of the products onto the rollers, and although said rollers often force them to orient progressively in the desired manner, sometimes this does not occur before the viewing area of the optical instrument is reached.

In this case, the movements of the product are irregular and do not expose its entire surface to the instrument, and therefore reading does not occur correctly and it is necessary to expel or reprocess the product, since the failure to acquire the parameters of interest does not allow to allocate it to the appropriate container. This compromises the productivity of the line, in an obviously undesirable manner.

SUMMARY

The aim of the present disclosure is to solve the problems described above, providing a conveyance apparatus that is capable of quickly arranging the conveyed horticultural products according to the desired orientation.

Within this aim, the disclosure provides a conveyance apparatus and a plant that allow a data acquisition instrument placed along the path to correctly acquire one or more parameters of interest.

the disclosure also provides a conveyance apparatus that ensures high reliability in use.

the disclosure further provides a conveyance apparatus that uses a technical and structural architecture that is alternative to those of apparatuses of the known type.

The disclosure provides a conveyance apparatus that can be obtained easily starting from commonly commercially available elements and materials.

the disclosure also provides a conveyance apparatus that has modest costs and is of assured application.

This aim and these and other advantages that will become better apparent hereinafter are achieved by providing an apparatus and a plant according to the claims.

BRIEF DESCRIPTION OF THE DRAWINGS

Further characteristics and advantages of the disclosure will become better apparent from the description of a preferred but not exclusive embodiment of the conveyance apparatus according to the disclosure, illustrated by way of non-limiting example in the accompanying drawings, wherein.

DETAILED DESCRIPTION OF THE DRAWINGS

Figure 1:
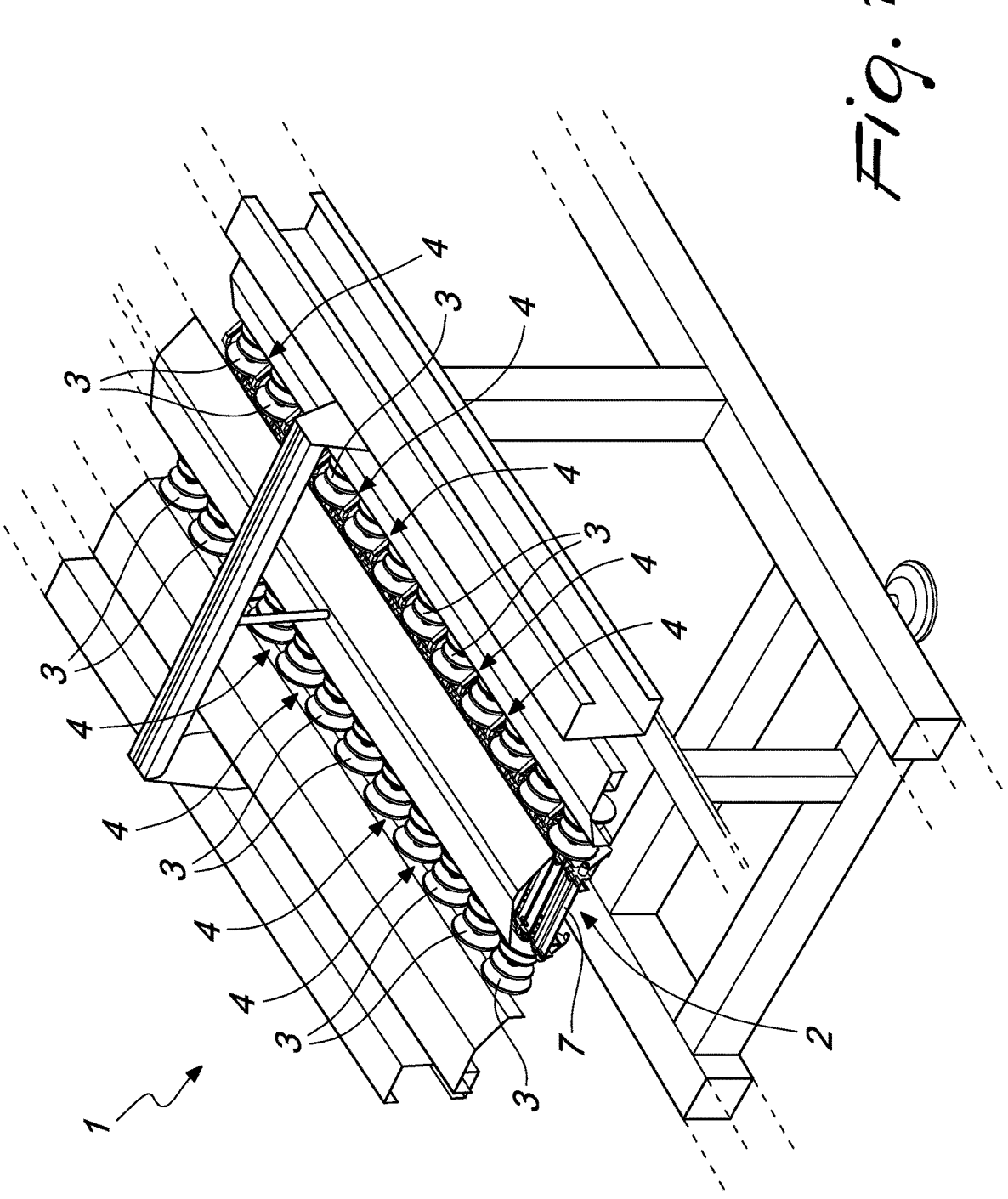
FIG. 1 is a schematic perspective view of the apparatus according to the disclosure.

With particular reference to the figures, an apparatus for conveying horticultural products A is generally designated by the reference numeral 1.

Usually, the apparatus 1 is designed to convey one specific type of horticultural product A, but in any case the possibility that the same apparatus 1 might convey different types of products A, especially if similar in terms of shape and technical problems that they pose for manufactures, is within the protective scope claimed herein.

It is also appropriate to note that the apparatus 1 can find application in relation to any horticultural product A (fruits, garden produce, vegetables, etcetera). At the same time, in the preferred application the product A has an oblong shape (elongated along a prevailing dimension) and dimensions and weight which are in any case of small amount: an example in this regard is constituted by kiwifruit (such as the two fruits whose outlines are visible in 10 broken lines in FIG. 2), but it is nevertheless reiterated that other fruits or products A (lemons, for example), whether oblong or not, can be conveyed by the apparatus 1.

The apparatus 1 comprises means 2 for the (periodic) cyclic movement along an advancement direction B of a plurality of rotating assemblies 3.

It should be noted that typically the means 2 make the assemblies 3 follow a closed annular path, a portion of which corresponds indeed to the advancement direction B: in the manners that will be clarified hereinafter, indeed along said portion the assemblies 3 mutually cooperate to convey and move in the direction B the products A, for any purpose and toward any destination. The closed path furthermore allows the cyclic return of the assemblies 3 upstream, in order to restore the initial conditions for each of them and allow to convey new products A.

The assemblies 3 are arranged in series along the direction B (and in general along the closed path that they follow) with the possibility to rotate about respective rotation axes C which are perpendicular to the direction B (and shown for the sake of simplicity only in some of the accompanying figures). The rotation axes C are also typically at right angles to the ideal resting plane of the apparatus 1.

At least some pairs of assemblies 3, chosen in any case as consecutive, define respective conveyance units 4 for corresponding horticultural products A, which can rest on such pairs substantially above the interspace between said assemblies 3 (which are indeed consecutive). Typically, each unit 4 accommodates and/or conveys one and only one product A.

The center distance between rotation axes C of consecutive assemblies 3, which are designed for the resting of a product A, is therefore chosen so as to maintain the width of the interspace small enough to allow the product A to rest on it without being able to fall below.

In this respect, each assembly 3 can cooperate both with the preceding assembly and with the following assembly for the resting of respective products A (thus helping to form two respective units 4), thus maximizing the conveyance capacity of the apparatus 1. Likewise, one assembly 3 can cooperate only with the preceding one or with the following one, for example in order to maintain a greater distance between the products A in transit.

By virtue of the rotation of the assemblies 3 about themselves, and in manners which are in any case per se known, the resting products A are in turn forced to rotate about themselves and, in some cases, to change their orientation. The rotation about themselves in particular, if it occurs while passing through the viewing area of a video camera or of another optical or vision instrument, allows these devices to analyze the entire external surface of said product A, in order to acquire data and information of interest. It is noted that this application is only an example of the use of the disclosure, which can be used in any case for other purposes as well. The orientation in which the products A are forcibly arranged by the assemblies 3 can also be sought for many other purposes (for which, therefore, as will be seen, the disclosure proves to be in any case of great use).

Figures 5, 6:
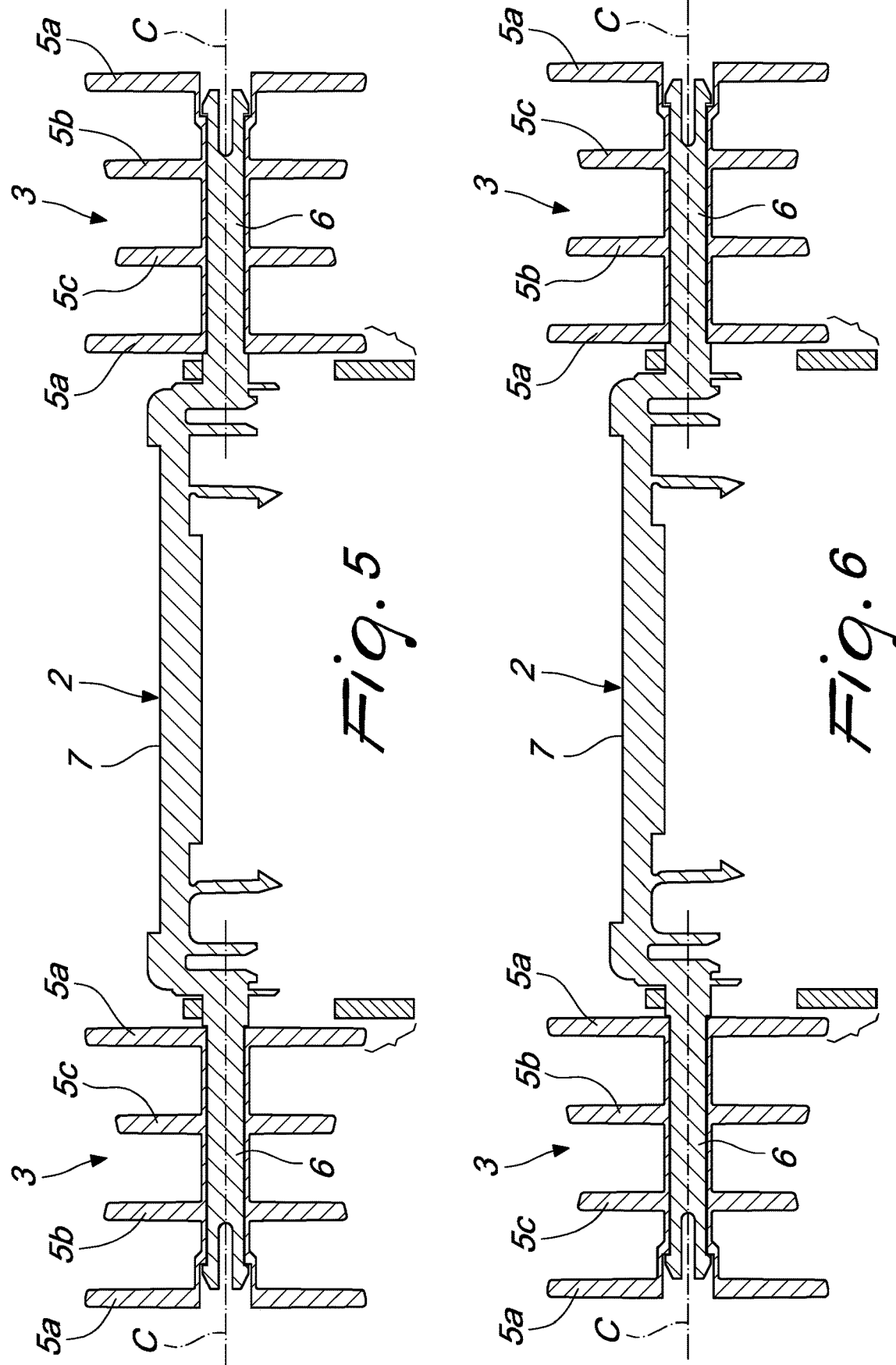
FIGS. 5 and 6 are sectional views of FIG. 4, taken along the planes V-V and VI-VI, respectively.

According to the disclosure, each assembly 3 comprises at least four rotating and circular disks 5a, 5b, 5c (and typically the disks 5a, 5b, 5c are exactly four), which are aligned coaxially along the respective rotation axis C (as the accompanying figures, for example FIGS. 5-6, clearly point out).

For example, the four disks 5a, 5b, 5c of the same assembly 3 can be mounted on pivots 6, which are oriented indeed along the respective axes of rotation C and are moved by the means 2.

In each unit 4 the external disks 5a of each assembly 3 have a larger diameter than the diameter of the internal disks 5b, 5c of the same assembly 3. In this manner, the external disks 5a acts as containment sides for the resting products A, preventing their lateral fall.

As is also obvious from looking at the figures, the terms "internal" and "external" are used in the present description with direct reference to the ordered sequence of the four disks 5a, 5b, 5c: the first and fourth of the sequence (or row) are external and the second and third, interposed between the other two, are internal.

Furthermore, a first internal disk 5b, which is larger, of each assembly 3 has a diameter that is larger than the diameter of the other internal disk 5c, which is smaller, with the larger disks 5b and the smaller disks 5c (which in any case, as mentioned, have a smaller diameter than the respective external disks 5a) arranged so as to be mutually offset in the two assemblies 3 of the same unit 4.

It is stressed that the term "diameter" of each disk 5a, 5b, 5c obviously refers to the diameter of its larger opposite (circular) faces. It should also be noted that in the present description the four (at least four) disks 5a, 5b, 5c of each assembly 3 are designated by just three different reference numerals: the reference "5a" is reserved for the two external disks (as appears and will appear evident, there is in fact no need to distinguish them further), while between the two internal disks, the one with the larger diameter has the reference "5b" and the one with the smaller diameter has the reference "5c".

The offset arrangement entails that when observing any unit 4 for example from above and along the direction B, if in one of the assemblies 3 the larger disk 5b is on the right and the smaller disk 5c is on the left, in the other assembly 3 of the same unit 4 (i.e., in the next or previous assembly 3) the opposite occurs (the larger disk 5b is on the left and the smaller disk 5c is on the right), and obviously vice versa.

The particular configuration of the disks 5a, 5b, 5c achieves the intended aim, since it is indeed because of it that the product A rested on each unit 4 is not only forced to rotate about itself but also undergoes a plurality of irregular and asymmetrical pushes and impulses, which (especially in the case of oblong products A) also allow to quickly modify its orientation (indeed in the case of oblong products A, this entails a change in the inclination or orientation of its prevailing dimension).

Figure 2:
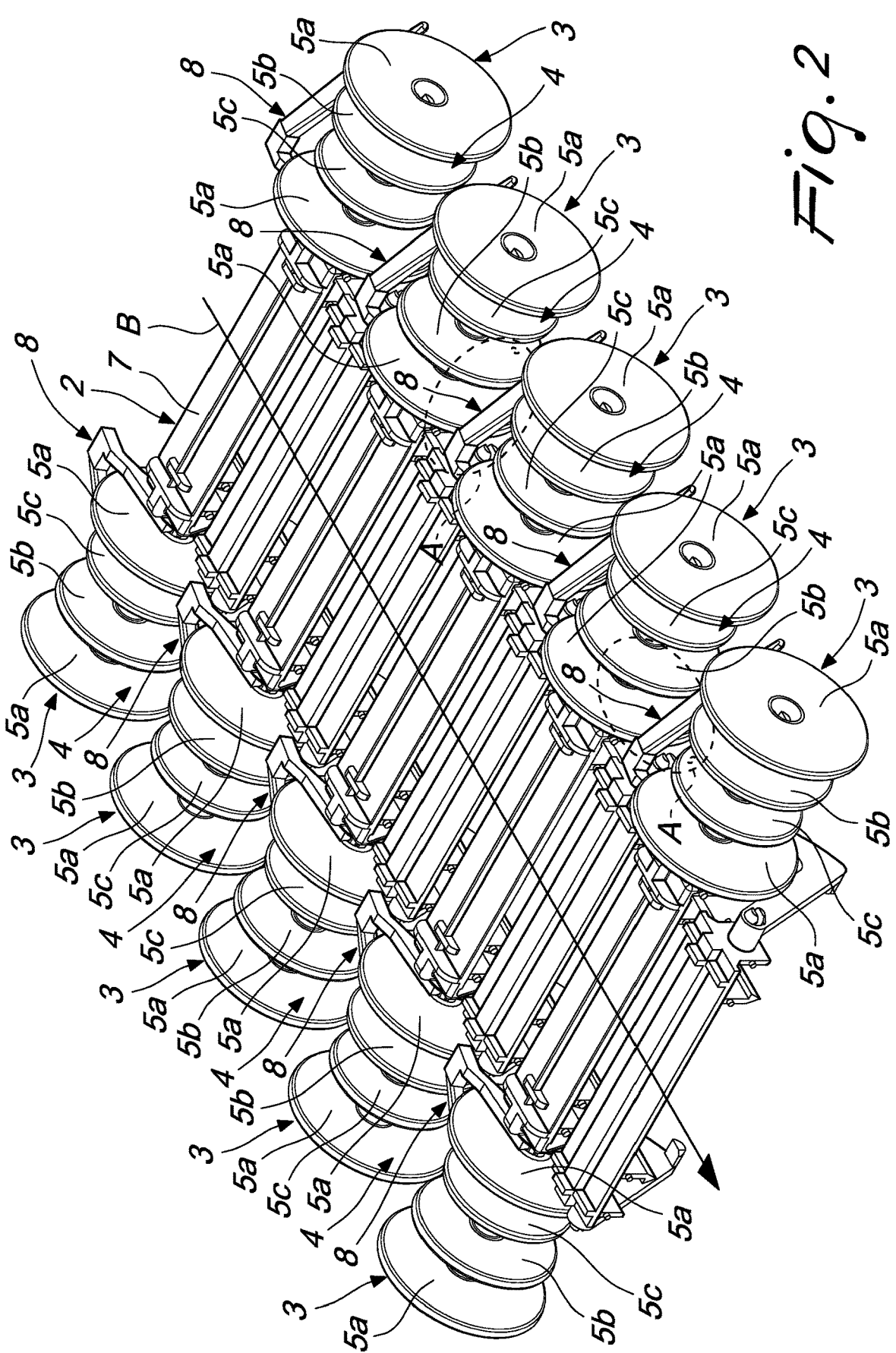
FIG. 2 is a highly enlarged perspective view of a portion of the apparatus of FIG. 1 and shows in detail some rotating assemblies.
Figure 3:
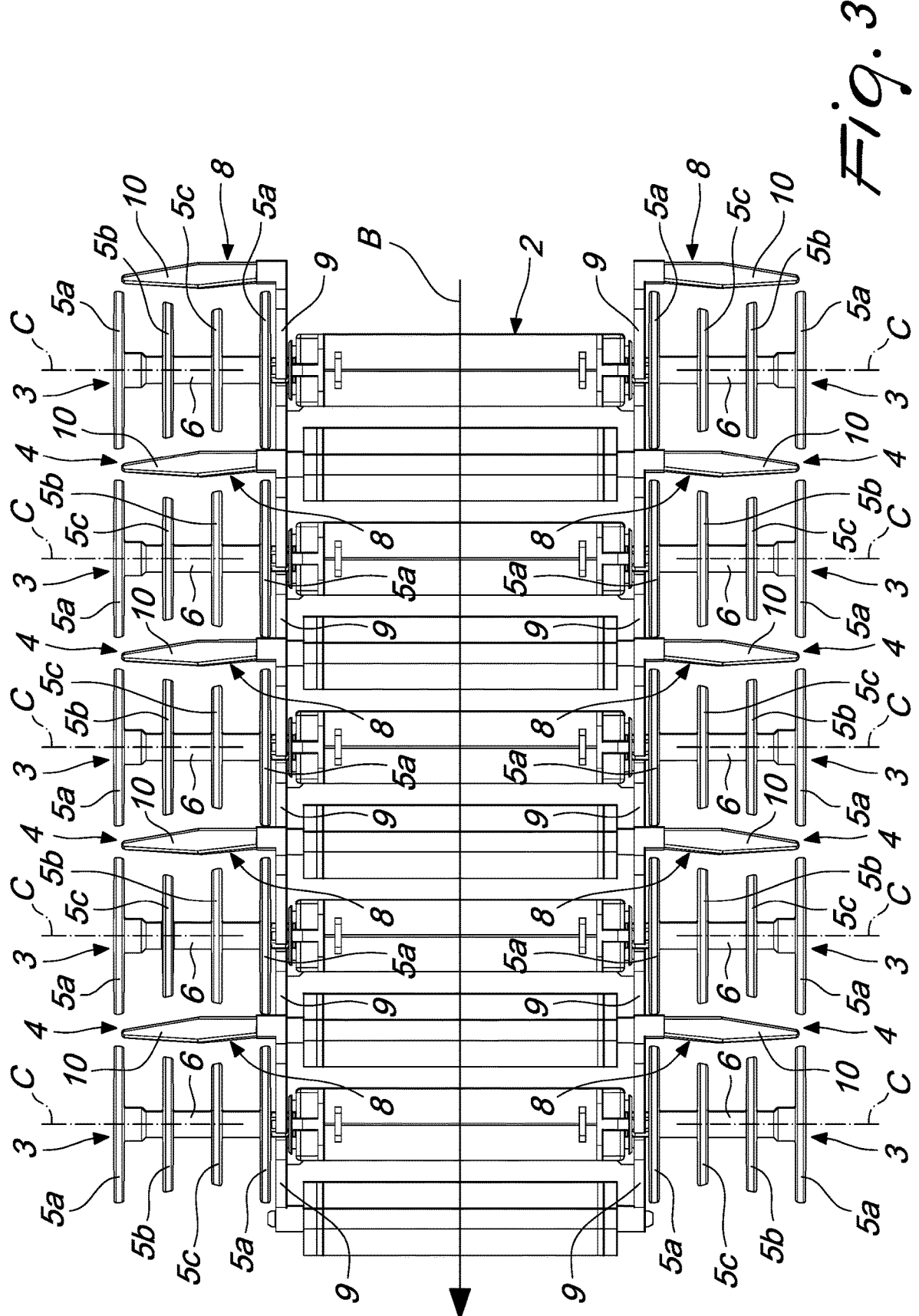
FIG. 3 is a top view of the portion of FIG. 2.
Figure 4:
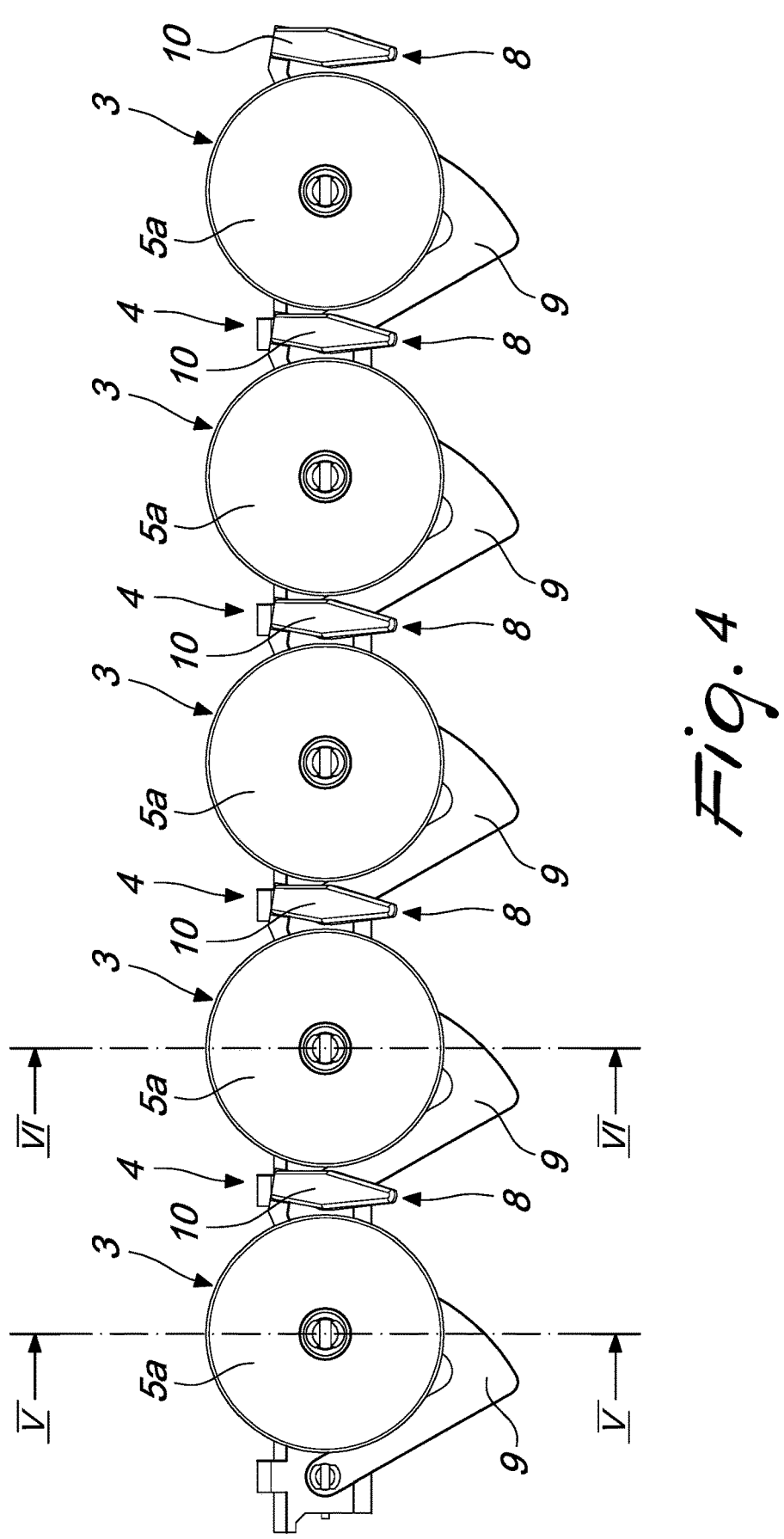
FIG. 4 is a lateral elevation view of the portion of FIG. 2.

In particular, if an oblong product A is deposited accidentally on a unit 4 with the prevailing dimension oriented parallel to the advancement direction B (like the product A shown in broken lines at the bottom left in FIG. 2), the stresses produced by the disks 5a, 5b, 5c quickly force it to be oriented with the prevailing dimension parallel to the rotation axis C (like the product A shown in broken lines at the upper right in FIG. 2), and in this (preferred) arrangement, following the rotation of the assemblies 3, the product A can simply rotate about itself without changing further the orientation and progressively exposing upward its whole surface. Products A rested in any other intermediate arrangements (with the prevailing dimension variously angled with respect to the rotation axis C) will be brought even quicker to the preferred arrangement just mentioned.

Usefully, the diameter of each external disk 5a can be the same and/or the diameter of each larger disk 5b can be the same and/or the diameter of each smaller disk 5c can be the same.

This evidently reduces the number of sizes of the disks 5a, 5b, 5c to be used, with evident benefits in terms of logistics and component management and supply: by choosing just three sizes, one for the diameters of the external disks 5a, one for the diameters of the larger disks 5b, and one for the diameters of the smaller disks 5c, it will be possible to assemble the apparatus 1 with just three sizes of the disks 5a, 5b, 5c.

In practice, therefore, in the preferred solution just introduced, in which only three sizes are used, the disks 5a, 5b, 5c can be combined to form just two versions of the assembly 3 (thus sufficient for the entire apparatus 1): a first version of the assembly 3 with the larger disk 5b on the right, the smaller disk 5c on the left, and two mutually identical external disks 5a, and a second version of assembly 3 with the larger disk 5b on the left (identical to the larger disk 5b of the other version), the smaller disk 5c on the right (identical to the smaller disk 5c of the other version), and again two external disks 5a which are mutually identical (and identical to the external disks 5a of the other version).

It is specified that the dimensions of the disks 5a, 5b, 5c and particularly the diameters may be any (obviously, in compliance with the conditions just shown), according to the requirements of the case. Merely by way of non-limiting example of the disclosure, in any case, some possible sizing examples are given which are useful (but not exclusive) if the products A are kiwifruits:

- diameter of the external disk 5a chosen in the range of 70-75 millimeters, and preferably equal to 73 millimeters,
- diameter of the larger disk 5b chosen in the range of 60-65 millimeters, and preferably equal to 64 millimeters,
- diameter of the smaller disk 5c chosen in the range of 55-60 millimeters, and preferably equal to 57 millimeters.

The manners of movement and traction of the assemblies 3 (of the disks 5a, 5b, 5c) can be any, according to the requirement and the state of the art, without thereby abandoning the protective scope claimed herein.

In one embodiment of considerable practical interest, the means 2 comprise a chain 7 which can move along the advancement direction B and supports (and entrains) the assemblies 3 along at least one side (thereof). In greater detail, the chain 7 is typically wound (and slidingly movable) on itself to form in practice the closed path imposed on the assemblies 3. The chain 7 (or a belt, or others) is therefore responsible for traction along the closed path of the assemblies 3, while the rotation about the rotation axes C can be imparted in a known manner, which therefore are not dwelt upon here.

Even more particularly, in the preferred embodiment, illustrated by way of non-limiting example in the accompanying figures, the apparatus 1 comprises two series of assemblies 3 (which can move parallel to each other, along the direction B), which are supported by the chain 7 at respective sides (of said chain 7).

The possibility is not excluded, however, to provide the apparatus 1 with two (or even more) series of assemblies 3 moved in a mutually independent manner, with the means 2 comprising in this case distinct components for each series. On the other hand, the choice to arrange respective series of assemblies 3 at the two sides of the chain 7 is of extreme practical interest, since it keeps space occupation and number of components involved low, with evident benefits in terms of cost, structural simplification and reliability.

FIG. 1 shows a possible example of (a portion of) chain 7: the person skilled in the art may easily complete it and integrate it with the other components necessary for its operation (providing for example a motor adapted to rotate a pinion around which said chain 7 is wound and engaged, indeed so as to move said chain).

Usefully, the apparatus 1 comprises an unbalancing element 8, configured to impart a further thrust or impulse to the horticultural product A which rests on the respective assemblies 3, during conveyance by the corresponding unit 4.

The element 8 in practice integrates and completes the action of the disks 5a, 5b, 5c, since the thrust that it imparts to the product A tends to unbalance it and therefore contributes to modifying its orientation and to arranging it in the desired manner (with the prevailing dimension parallel to the rotation axes C). The thrust that it imparts is sized and chosen to have such intensity and direction as to indeed facilitate a change in the orientation of the product A, but not so violent as to damage it or cause the product A to leap over one of the external disks 5a and thus fall from the assemblies 3 (on which, it should be noted, said product A is simply rested).

Figure 7:
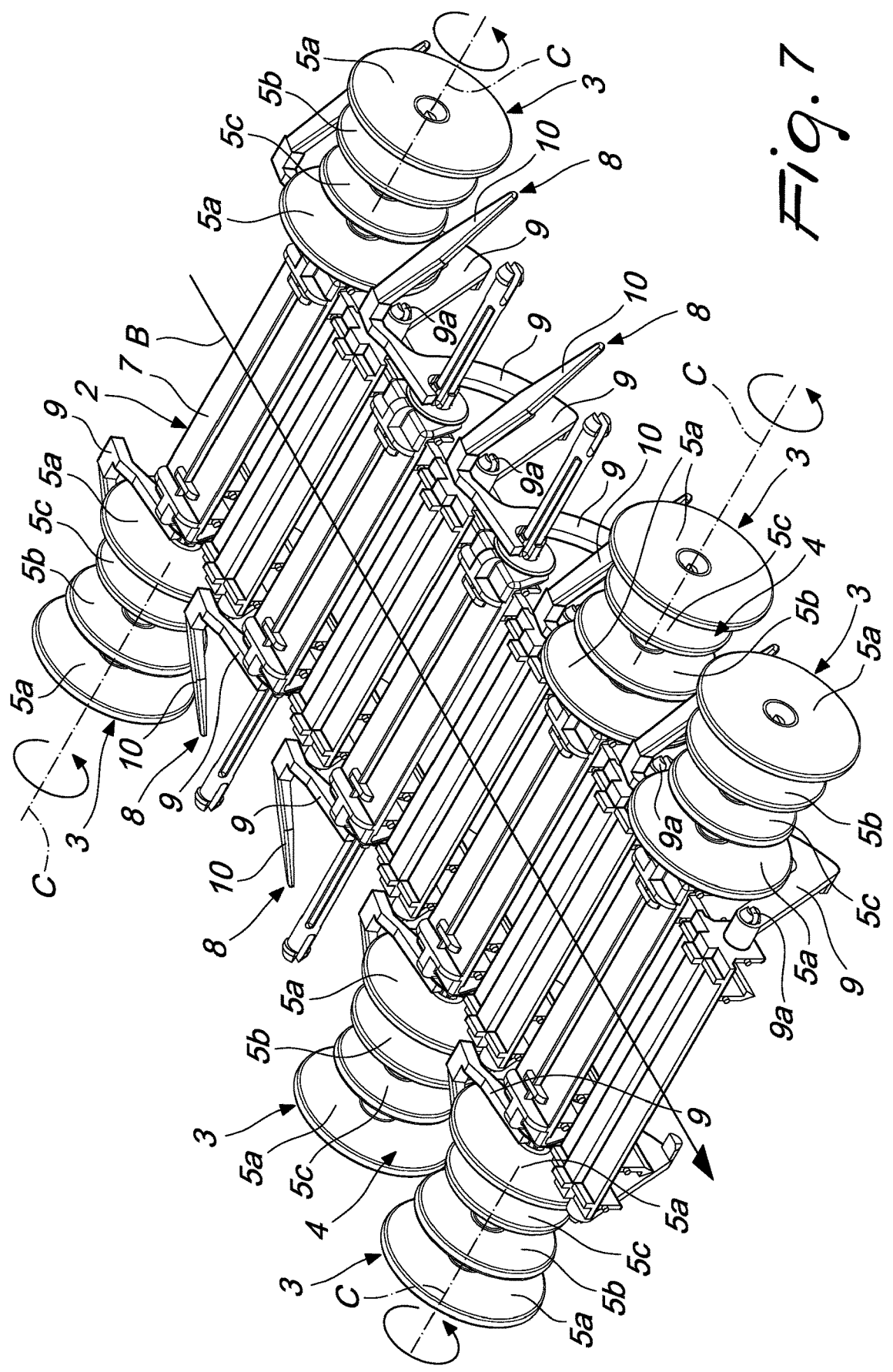
FIG. 7 is the same perspective view of the portion of FIG. 2, without some rotating assemblies.
Figure 8:
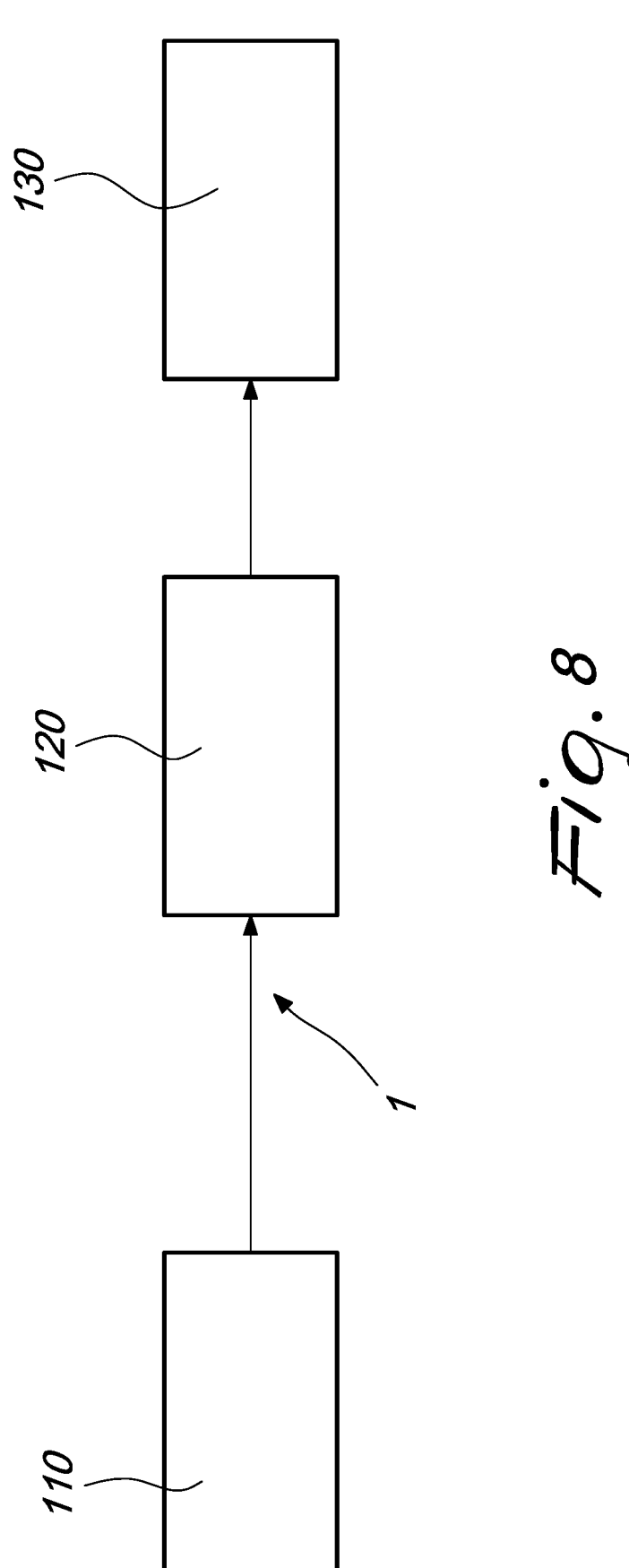
FIG. 8 is a block diagram showing schematically the configuration of a plant provided with the apparatus of FIG. 1.

In particular, the element 8 comprises a contoured lever 9, which is coupled rotatably with one of its ends to the unit 4 and/or to the chain 7 and has, on the opposite side, a finger 10 which is (usually) arranged transversely with respect to the direction B, substantially at the interspace (under the region designed to be occupied by the product A). In greater detail, as clearly highlighted particularly by FIG. 7, the lever 9 extends parallel to the advancement direction B and can rotate about a fulcrum 9a (shown for the sake of simplicity only in FIG. 7) which is associated with the chain 7 along an articulation axis which is parallel to the rotation axes C. The finger 10 extends at right angles to the lever 9 so as to be arranged indeed in the interspace, preferably with a downward inclination with 20) respect to the ideal plane identified by the adjacent portion of the chain 7.

The lever 9 is movable (by virtue of the traction by the chain 7 and/or in general of the means 2) along a trajectory for affecting a fixed obstacle (which is not shown in the figure but can be a cam or an ascent ramp arranged in fact along the path of the lever 9), so as to be forced to oscillate as a consequence of the impact with said obstacle (in order to be able to move beyond it and continue its travel) and to determine the movement of the finger 10, with consequent thrust imparted to the product A.

In greater detail, as shown by the accompanying figures, the lever 9 is V-shaped and as a consequence of the impact with the obstacle arranged along its path it "rises again" on said obstacle in order to leap over it and then return by gravity to the starting position (the one shown in the figures). The ascent determines in fact the temporary lifting of the finger 10, which can thus impart a thrust on the product A.

As pointed out, the protective scope claimed herein extends to any use of the apparatus 1, in systems for treating or conveying products A of any type and for any purpose (in particular, obviously, whenever it is required or desirable to be able to quickly bring the product A to a specific orientation or anyway make it rotate about itself in a complete manner).

At the same time, an object of the present disclosure is a specific type of plant 100 for the treatment of horticultural products A, which allows indeed to enhance the particularities of the apparatus 1.

Therefore, in particular, the plant 100 comprises in series at least one loading station 110, a data acquisition station 120 and a selective unloading station 130.

The loading station 110 is configured to feed a movement and treatment line with an unsorted mass of horticultural products A.

Typically, the products A arrive at the plant 100 directly from the picking fields (or from previous pre-processing systems), where they are accumulated in containers of various types precisely in an indiscriminate manner, that is, regardless of their size, shape, color, degree of ripeness, etcetera.

The products A, which are thus heterogeneous, are then poured onto the line at the loading station 110, from which in various manners they are sent downstream.

The data acquisition station 120 is arranged along the line cited above and is configured to acquire (for example by vision, but not necessarily) information related to at least one parameter of interest of each horticultural product A in transit and to transmit such information to an electronic control and management device.

The manner in which such information is acquired, so as the specific choice of components and technologies used to provide the data acquisition station 120 can be any according to the requirements. Typically, the data acquisition station 120 comprises one or more video cameras associated with an image processing software, capable of obtaining from the images the information related to the parameter of interest of each horticultural product A in transit and transmit it to the electronic device. The at least one parameter of interest is preferably chosen from color, shape, dimensions, sugar content, degree of ripeness, defectiveness and weight. However, it is not excluded to acquire information regarding two or more of such parameters, and the data acquisition can in any case occur with methods that are different from those just described (it might involve weighing, for example).

The electronic device can be of any type, and for example can be a control unit or a computer; typically, in any case, it is the same electronic device that controls the operation of the entire plant 100.

The selective unloading station 130 is in turn arranged along the line (downstream of the data acquisition station 120) and is configured to convey in a selective manner each horticultural product A in transit toward one of at least two distinct collection stations (where baskets, crates, tanks or containers of other type can be arranged), on the basis of commands issued by the electronic device as a function of the information acquired at least by the data acquisition station 120.

The selective unloading station 130 thus sends each product A to the specific station designed to accommodate all and only those products A for which the measured parameter assumes a predefined value (or falls within a predefined range). For example, there may be different stations to accommodate horticultural products A having different weights or grammage, or having different colorings (shades of color), or others. In other words, the plant 100 allows (starting from the unsorted and heterogeneous mass with which the loading station 110 is fed) to divide the horticultural products A into homogeneous subgroups (each of which is accumulated in a respective station), while being able to perform numerous other checks and verifications.

So far, however, the plant 100 is of a known type and can be assembled and integrated with other components or features, drawing on common industry expertise.

Therefore, according to the disclosure, the plant 100 comprises an apparatus 1 according to what has been described and shown so far, which is configured to convey the horticultural products A at least along a portion of the line upstream of the data acquisition station 120 (and also along the line segment that passes through said data acquisition station 120).

In particular, the apparatus 1 can receive the products A already downstream of the loading station 110 (optionally with the interposition of preliminary washing or preselection stations), and take charge of conveying them not only up to the data acquisition station 120, but also beyond, up to the selective unloading station. In order to allow correct reading in the data acquisition station 120, the plant 100 is configured so as to deposit one and only one product A in each unit 4.

The apparatus 1 therefore allows to force quickly the products A to arrange themselves in the desired manner, so that when they reach the area of action of the data acquisition station 120 their rolling (caused by the rotating assemblies 3) allows progressively to expose to said station the whole surface of said products A.

In this manner it is possible to ensure a correct acquisition of the parameters of interest by the data acquisition station 120 and therefore the correct unloading in the most appropriate station, for all the products A in transit. It should be noted that this is true if the data acquisition station 120 comprises a video camera or similar optical systems, and also for other acquisition methods, such as for example a weighing (which in any case requires the product A to be arranged as stably as possible, as indeed allowed rapidly by the assemblies 3).

The operation of the apparatus (and of the plant) according to the disclosure is evident from what has been illustrated so far.

In particular, it should be noted however that the products A can be deposited one by one (according to various methods) in the units 4, where they are conveyed by simply resting between two consecutive assemblies 3.

While the units 4 convey the products A toward the downstream sections (for example, but not necessarily, toward a data acquisition station 120), the rotation of the assemblies 3 causes the movement (rotation) of said products A. In particular, by virtue of the specific configuration of the disks 5a, 5b, 5c and the offset between the larger disks 5b and the smaller disks 5c, the stresses imparted to the products A are irregular (asymmetrical) and are thus particularly effective, for example, in forcing a change in the orientation of oblong products A, in order to make them arrange themselves rapidly with the prevailing dimension parallel to the axis of rotation C of the assemblies 3 (of the disks 5a, 5b, 5c).

This is of particular interest in various contexts and especially when one wishes to expose progressively the entire surface of the product A to a video camera or other optical device, as in the data acquisition station 120 (but also when there are other types of instruments in this station).

Differently from known solutions, the specific configuration of the disks 5a, 5b, 5c ensures that all the products A are arranged in the desired orientation in a short time and thus indeed before reaching the data acquisition station 120, also keeping the upstream travel of the products A on the units 4 relatively modest.

In this context, it has been shown that the use of an unbalancing element 8 can increase the effectiveness of the action of the disks 5a, 5b, 5c, by cooperating with them in order to force the desired change of the orientation of the products A.

In practice it has been found that the apparatus according to the disclosure fully achieves the intended aim, since the use of the disks 5a, 5b, 5c, conveniently configured and sized, allows to quickly arrange the conveyed horticultural products A according to the desired orientation.

By virtue of this prerogative, the apparatus 1 and the plant 100 that implements it allow a data acquisition station 120 arranged along the path (be it an optical instrument, a weighing station, or others) to correctly acquire one or more parameters of interest.

The constructive simplicity that characterizes the assemblies 3 and the disks 5a, 5b, 5c, in particular, is furthermore an assurance of low cost and reliability, even over time.

The disclosure thus conceived is susceptible of numerous modifications and variations, all of which are within the scope of the appended claims; all the details may furthermore be replaced with other technically equivalent elements.

In the exemplary embodiments described, individual characteristics, given in relation to specific examples, may actually be replaced with other different characteristics that exist in other exemplary embodiments.

In practice, the materials used, as well as the dimensions, may be any according to the requirements and the state of the art.

The invention claimed is:

1. An apparatus for conveying horticultural products, comprising means for cyclic movement along an advancement direction of a plurality of rotating assemblies, arranged in series along said advancement direction with a possibility to rotate about respective rotation axes which are perpendicular to said advancement direction, at least some pairs of said rotating assemblies, which are consecutive, defining respective conveyance units for corresponding horticultural products, which can be rested on said pairs of said rotating assemblies substantially above an interspace between said rotating assemblies, wherein each one of said rotating assemblies comprises at least four rotating and circular disks which are aligned coaxially along the respective said rotation axis, in each said conveyance unit said external disks of each said rotating assembly having a larger diameter than said internal disks of the same said rotating assembly and a first said internal disk, which is larger, of each said rotating assembly having a diameter that is larger than a diameter of another said internal disk, which is smaller, said larger disks and said smaller disks being arranged so as to be mutually offset in the two said rotating assemblies of the same said conveyance unit.

2. The apparatus according to claim 1, wherein the diameter of each one of said external disks is the same and/or wherein the diameter of each one of said larger disks is the same and/or wherein the diameter of each one of said smaller disks is the same.

3. The apparatus according to claim 1, wherein said means for cyclic movement comprise a chain configured to can move along said advancement direction and support said rotating assemblies along at least one side.

4. The apparatus according to claim 3, further comprising two series of said rotating assemblies, which are supported by said chain at respective said sides.

5. The apparatus according to claim 1, further comprising an unbalancing element, configured to impart a further thrust to the horticultural product which rests on respective said rotating assemblies during conveyance by the corresponding said conveyance unit.

6. The apparatus according to claim 5, wherein said unbalancing element comprises a contoured lever, which is coupled rotatably with one of ends thereof to said conveyance unit and/or to said chain and has, on an opposite side, a finger which is arranged transversely with respect to said advancement direction, substantially at said interspace, said lever being movable along a trajectory for affecting a fixed obstacle, for an oscillation thereof as a consequence of an impact with said obstacle and a movement of said finger, with a consequent thrust imparted to the horticultural product.

7. A plant for the treatment of horticultural products, comprising in series at least:

a loading station configured to feed a movement and treatment line with an unsorted mass of horticultural products, a data acquisition station, which is arranged along said treatment line and is configured to acquire information related to at least one parameter of interest of each horticultural product in transit and to transmit said information to an electronic control and management device, a selective unloading station, which is arranged along said treatment line and is configured for a selective conveyance of each horticultural product in transit toward one of at least two distinct collection stations, on a basis of commands imparted by said electronic control and management device as a function of the information acquired at least by said data acquisition station, and further comprising an apparatus according to claim 1, configured for the conveyance of the horticultural products at least along one portion of said line upstream of said data acquisition station.

* * * * *